Aug. 17, 1937. P. HAIG 2,090,327
DIVIDED CAR AXLE
Filed Nov. 6, 1935
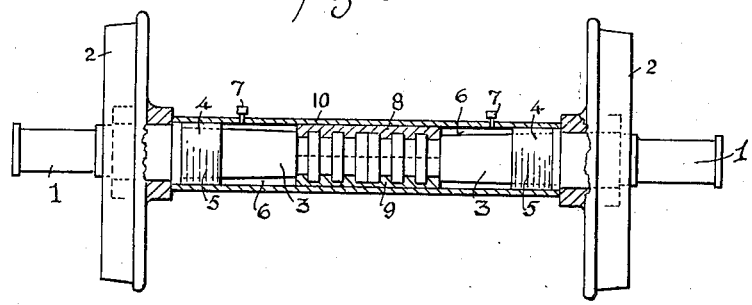
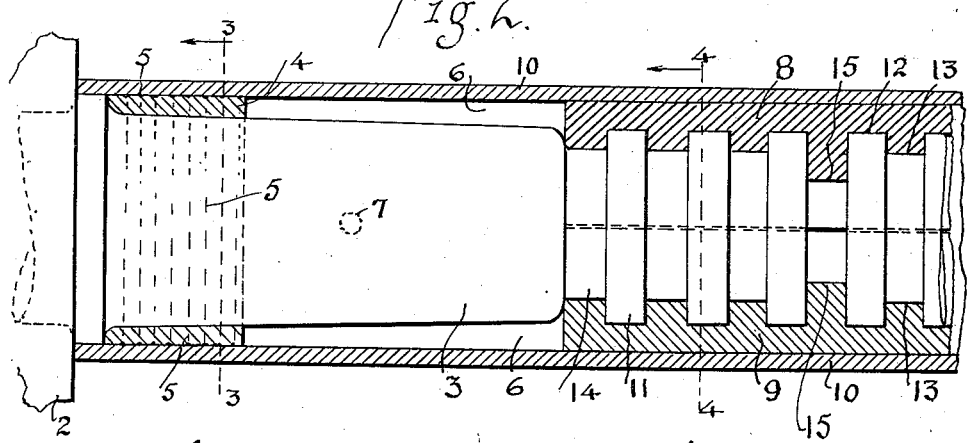
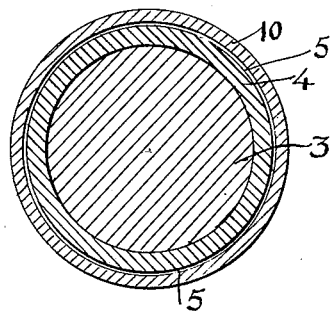 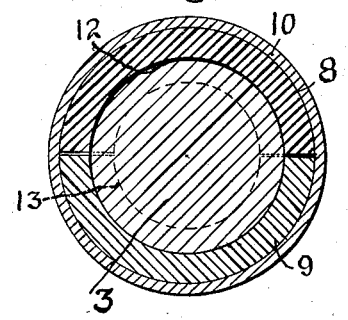
Paul Haig  Inventor
By  N. S. Anstutz
Attorney Patented Aug. 17, 1937

2,090,327

UNITED STATES PATENT OFFICE 2,090,327

DIVIDED CAR AXLE

Paul Haig, Chicago, Ill.

Application November 6, 1935, Serial No. 48,552

2 Claims. (Cl. 295—39)

My invention relates to improvements in divided car axles and it more especially consists of the features hereinafter pointed out in the claims.

The purpose of my invention is to provide a two-part car axle so as to permit one wheel to travel at a different rate of speed than the speed of the other wheel, thus adapting each wheel to its proper rotational speed according to the arc of a curve on which it is rolling, which speed is proportional to the difference of radii of the two curves; that will also provide a direct utilization of existing car axles by simply cutting the axle into two parts, an allowance being made for the width of the cut in the grooved sleeve which fits around the adjacent ends of the correspondingly grooved axle; that further provides a reinforcing tube extending from wheel to wheel to retain more than the original strength of an undivided car axle; and that also provides means for self-sealing the ends of the tube where such ends engage bushings that have a plurality of grooves formed on their external surface.

With these and other ends in view I illustrate in the accompanying drawing such instances of adaptation as will disclose the broad underlying features of the invention without limiting myself to the specific details shown thereon and described herein.

Fig. 1 is a side elevation in section showing a two part car axle with the adjacent ends abutting each other.

Fig. 2 is an enlarged section of a portion of a divided car axle, showing a compensating ridge in the aligning sleeve.

Fig. 3 is a section on line 3—3 of Fig. 2.

Fig. 4 is an elevation in section on line 4—4 of Fig. 2.

In the use of my invention I may employ whatever equivalents and alternatives of construction that the exigencies of varying conditions may demand without departing from the basic features of my invention.

A divided car axle 3 has bearings 1 at its extreme outer ends. Next to the bearings 1 car wheels 2 are positioned. These wheels are usually applied under hydraulic pressure to make them almost integral with the axle. When newly made the divided axle 3 has its inner adjacent ends engage each other. These ends are provided with annular ridges 11 and interspaced grooves 14. A two part sleeve 8—9 has annular ridges 13 corresponding to the grooves 14 and annular grooves 12 corresponding to the ridges 11 of the car axle.

In the practical application of my invention dependence is not placed only on the grease cups 7 and the grease chambers 6 for the maintenance of lubrication. It is of equal importance that the lubricant be prevented from being extruded between the external tube 10 and the end bushings 4 and at the same time the ingress of dirt etc. past the end bushings is likewise prevented. These results are secured by forming a plurality of shallow annular grooves 5 on the external surface of the bushings. The presence of these grooves serves the same purpose as would a removable packing. Any tendency for dirt from the outside and grease or other lubricant from the inside successfully passing all of the grooves is extremely remote for the reason that as the first groove from either end of the bushing becomes filled, it serves to retard movement past it to the next groove etc.

When new axles are made the adjacent ends of a two part axle may meet as shown in Fig. 1. In case old axles are to be adapted, the space that would be removed in separating them after the grooves 14 and the ridges 11 have been formed may be occupied in part or in its entirety by a compensating ridge 15 of the two-part sleeve 8—9 as shown in Figure 2. The bushings 4 may be shrunk onto the axle or secured thereon in any equivalent way.

The split sleeve 8—9, as stated above, is formed in two parts. There may be a clearance space, of whatever degree is found desirable in practice, between the lengthwise meeting edges of the one-half 8 of the groove sleeve and the other half 9 of the sleeve. The parts are assembled in the following order or in any variations of it that may be found expedient in the reconditioning of old axles or the production of new ones. If old axles are reconditioned one may be removed by hydraulic pressure. The grooves 14 and ridges 11 are formed and the portion of the axle adjacent the wheel cleaned for the bushings 4. Then the axle will be separated at the center lengthwise thereof and a grooved split-sleeve 8—9 having corresponding grooves 12 and ridges 13 with a compensating ridge 15 will be placed on the axle and bushings 4 will be positioned in their respective places. The reinforcing tube 10 will then be placed over the bushings and the car wheel that was first removed will be pressed into position on the axle outside of a bushing, the diameter of the axle at this point is smaller than the external diameter of the bushing which allows the reinforcing tube 10 to be freely passed over the bushings. As soon as the wheel is in place the job will be complete. In the case of two part axles being newly formed the assemblage of the different parts will be substantially made in the same order excepting that the grooves on the adjacent axle ends and those formed in the sleeve will be specially adapted to the absence of a cutting off clearance between the ends of the two part reconditioned axle. In either case one wheel is left off until the parts are assembled, after assemblage, by reason of the reinforcing tubes 10, there is produced a unitary structure which permits of one wheel being rotated independently of the other wheel and in substance, the structure will if anything, be as strong or stronger than an undivided axle.

Lubricant is admitted into the chamber 6 through grease cups 7 and in order to secure the free circulation of the lubricant around the grooves of the split sleeve 8—9 and the grooves of the adjacent ends 3 of the divided car axle the edges of the split sleeve are separated so that as the axle rotates only one pair of edges of the split sleeve will be brought together and the opposite edges will be separated to permit easy access of the grease to the ridges and grooves. If there were no "play" between the edges of the half sleeves there would be little or no traverse of the lubricant to the grooves and ridges because the outer diameter of the split sleeve engages the inside diameter of the tube 10, Figs. 2 and 4.

What I claim is:

1. In a divided car axle enclosed by a split sleeve, means for securing complete lubrication inside of the sleeve which comprises an internally grooved half sleeve, a second internally grooved half sleeve, an aligning tube for the half sleeves engaging their outer surface the circumference of the said half sleeves being such that a lengthwise opening is formed between the adjacent edges of each half, grooved axle ends enclosed by the split sleeve, and a one piece sleeve on each half of the axle positioned adjacent a car wheel serving as a bearing for the aligning tube the interior of which has bearing on all the sleeves simultaneously.

2. A two part car axle comprising a tube extending the full length of the axle between the car wheels, a one piece sleeve on the axle at each end of the tube, a plurality of grooves on the adjacent ends of the divided axle, a grooved sleeve divided lengthwise into two parts for simultaneously engaging both of the grooved axle ends, a lubricating chamber around each axle portion between the grooves and the end sleeves, and means comprising a lengthwise separation between the adjacent faces of the split sleeve to provide free circulation of lubrication endwise of the axle across the grooved portions.

PAUL HAIG.